United States Patent [19]

Bisson

[11] 3,773,236

[45] Nov. 20, 1972

[54] APPARATUS FOR THE FEED OF A MAGNETIC RECORDING TAPE

[75] Inventor: Flavio Bisson, Montalto Dora, Italy

[73] Assignee: Ing C. Olivetti & C., S.p.A., Ivrea (Turin), Italy

[22] Filed: Jan. 26, 1972

[21] Appl. No.: 220,814

[30] Foreign Application Priority Data

Jan. 28, 1971 Italy .............................. 67276 A/71

[52] U.S. Cl. ................ 226/186, 274/4 B, 274/11 B

[51] Int. Cl. ............................................ B65h 17/12

[58] Field of Search .................... 226/176, 177, 181, 226/186, 187; 242/55, 19 A; 274/4 D, 4 B, 4 C, 11 F, 11 D, 11 C, 11 B, 11 E

[56] References Cited

UNITED STATES PATENTS

| | | | |
|---|---|---|---|
| 2,499,700 | 3/1950 | Tinkham | 274/4 B X |
| 3,339,816 | 9/1967 | Iribe | 226/187 X |
| 3,432,169 | 3/1969 | Schroder | 274/4 B |
| 3,662,937 | 5/1972 | Borman | 226/194 X |

*Primary Examiner*—Richard A. Schacher
*Attorney*—William E. Schuyler, Jr. et al.

[57] ABSTRACT

The apparatus is used for the feed of a magnetic recording tape, particularly of the type closed in the form of a loop and contained in a removable cartridge used as a record store of recirculating type and employed as an external mass memory for the purpose of recording and/or playing back data or programs. The cartridge is equipped with a cylindrical driven roller in constant contact with the rear surface of the tape, while an exposed portion of the tape bears against a magnetic head and a driving roller so that the exposed portion is nipped between the driving roller and the driven roller. The driven roller is resiliently mounted and/or is provided with a resilient covering whereby the driven roller can adapt itself to the driving roller.

6 Claims, 4 Drawing Figures

APPARATUS FOR THE FEED OF A MAGNETIC RECORDING TAPE

FIELD OF THE INVENTION

The present invention relates to apparatus for the feed of a magnetic recording tape, in particular of the type closed in the form of a loop which is normally employed as a large-capacity store in information processing equipment and which is normally contained in a recording tape cartridge acting as a loader for archive or record stores of recirculating type adapted to be fitted selectively in removable fashion to the processing equipment for the purpose of recording and/or playing back data or programmes.

DESCRIPTION OF THE PRIOR ART

In a known type of recording tape cartridge, the tape is arranged in the interior cavity of the cartridge in successive folds, the cartridge being provided with openings through which the tape can emerge both so that it can be brought into contact with a recording or playback head and so that it can be made to advance by means not belonging to the cartridge itself.

An apparatus for recording or playing back information signals on a magnetic recording tape is known in which there are provided a head and an entraining roller adapted to cause the tape to advance past the head; in this apparatus the tape is enclosed in a removable cartridge from which it emerges over a short distance so as to present one of its faces to the outside; means are moveover provided for engaging the cartridge with, and coupling it to, the apparatus in such manner that the exposed part of the tape passes over the head and over the entraining roller.

In this apparatus, the entraining or driving roller which causes the magnetic tape to advance is the only such roller and co-operates with a vacuum system. Moreover, in order to obtain good adhesion of the tape to the driving roller, the latter has an outer covering formed by a layer of rubbery material in which circumferential grooves are formed.

The apparatus of the type described has a number of disadvantages, however, First of all, in the long run the aforesaid grooves may through constant rubbing damage that surface of the tape with which they come into contact and which is the side with the magnetic oxide coating. Moreover, there is considerable friction between the driving roller and the tape when the latter is set in motion. In this apparatus, in fact, the driving roller rotates continuously and it is the vacuum system that governs the frictional force between the tape and the roller. On starting up, therefore, when the tape passes from the zero initial speed to the driving speed of the roller it is subjected to considerable friction.

Furthermore, since the rubbery layer of the driving roller is constantly in contact with the magnetized surface of the tape, it is liable to deteriorate due to inclusions of magnetic powder or material between its fibres.

In the above-mentioned apparatus, moreover, the tape is not guided by the driving means during the driving phase, as a result of which it may be subject to lateral movements which cause wear of the edges as a result of friction against the guides controlling it in the vicinity of the head, and this may subsequently be detrimental for correct recording or playback.

BACKGROUND OF THE INVENTION

In order to overcome these disadvantages, the present invention provides apparatus for the feed of magnetic recording tape comprising a fixed part including a magnetic head and a tape driving roller, a removable cartridge containing the tape and having a driven roller of cylindrical form in constant contact with the rear surface of the tape, and means for attaching the cartridge to the fixed part in a fixed position in which an exposed portion of the tape bears against the magnetic head and an exposed portion of the tape is nipped between the driving roller and the driven roller, the driven roller being resiliently mounted and/or having a resilient covering whereby the driven roller can adapt itself to the driving roller.

BRIEF DESCRIPTION OF THE DRAWINGS

A preferred embodiment of the invention is presented by way of example in the following description and in the accompanying drawings, in which.

DESCRIPTION OF A PREFERRED EMBODIMENT OF THE INVENTION

Figure 1:
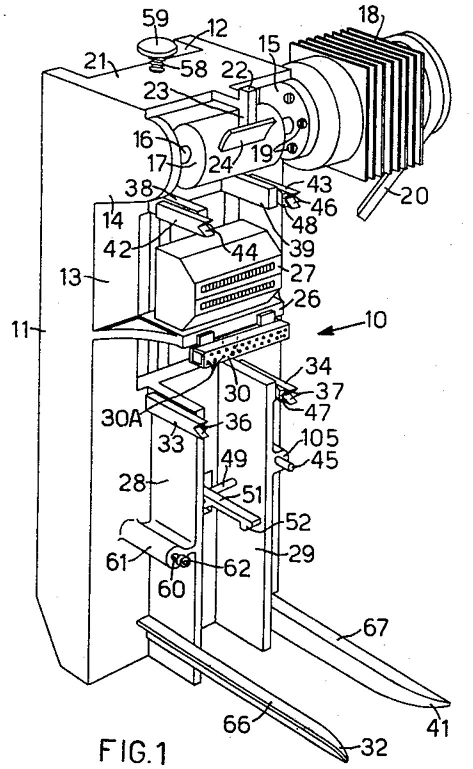
FIG. 1 is a perspective view of the fixed portion of apparatus embodying the invention.

Referring to the drawings, the apparatus comprises a fixed portion 10 (FIG. 1) constituted by two uprights 11 and 12 which are substantially vertical and parallel to one another and interconnected by a plate 13. At their upper end the two uprights 11 and 12 have two projections 14 and 15 in which there is mounted a rotatable shaft 16 on which a driving roller 17 made of metal of high hardness is keyed.

The shaft 16 is connected to a clutch 18 arranged on the outer surface of the projection 15 and fixed thereto, for example, by means of screw 19. The clutch 18, which is of the electromagnetic type, is connected through the medium of a belt 20 to a motor not shown in the drawing.

The two uprights 11 and 12 are connected at the top by a plate 21 on the front edge of which there is arranged in a central position a hook 22 which supports by means of its lower extension 23 a first tape-spacing shoe 24 located above the roller 17 and spaced slightly from it.

Perpendicularly to the plate 13 and below the driving roller 17 there is arranged a bracket 26 adapted to support a recording and/or playback head 27. Arranged on the bracket 26 below the head 27 is a tape-cleaning bar 30 bearing at the front a series of holes **30*a*** formed with a sharp edge.

The lower part of the plate 13 bears two side pieces 28 and 29 perpendicular thereto and integral therewith. These side pieces are parallel to one another and support two centering guides 33 and 34. These guides are disposed at the same horizontal level and are provided with V-shaped grooves 36 and 37 at one end.

Between the roller 17 and the head 27, perpendicularly to the plate 13 and integral therewith, there project horizontally two arms 38 and 39 to which another two centering guides 42 and 43 are fixed, these guides being similar to the guides 33 and 34 and provided with V-shaped grooves 44 and 46 at one end thereof. In addition to the upper guides 42 and 43 being at the same horizontal level, they are also each arranged in the vertical plane of the corresponding lower guide 33 or 34.

Between the guide 34 and the side piece 29 and moreover between the guide 43 and the arm 39 there are arranged leaf springs 47 and 48 having a form substantially similar to that of the guides 34 and 43.

Between the side pieces 28 and 29 is housed a pin 49 (FIGS. 1 and 4) on which there is pivoted the lever of a catch 51 terminating at one end in a hook 52. The other end of the catch 51 is pivoted by a spindle 53 to the end 54 of a cylindrical bar 55 disposed behind the plate 13 and slidable at its upper portion 56 in a hole 57 in the plate 21. The bar 55 is urged upwardly by a spring 58 between the plate 21 and a knob 59 at the top of the bar. A stop 90 co-operates with the lower face of the plate 21 to limit the upward travel of the bar 55.

Figure 4:
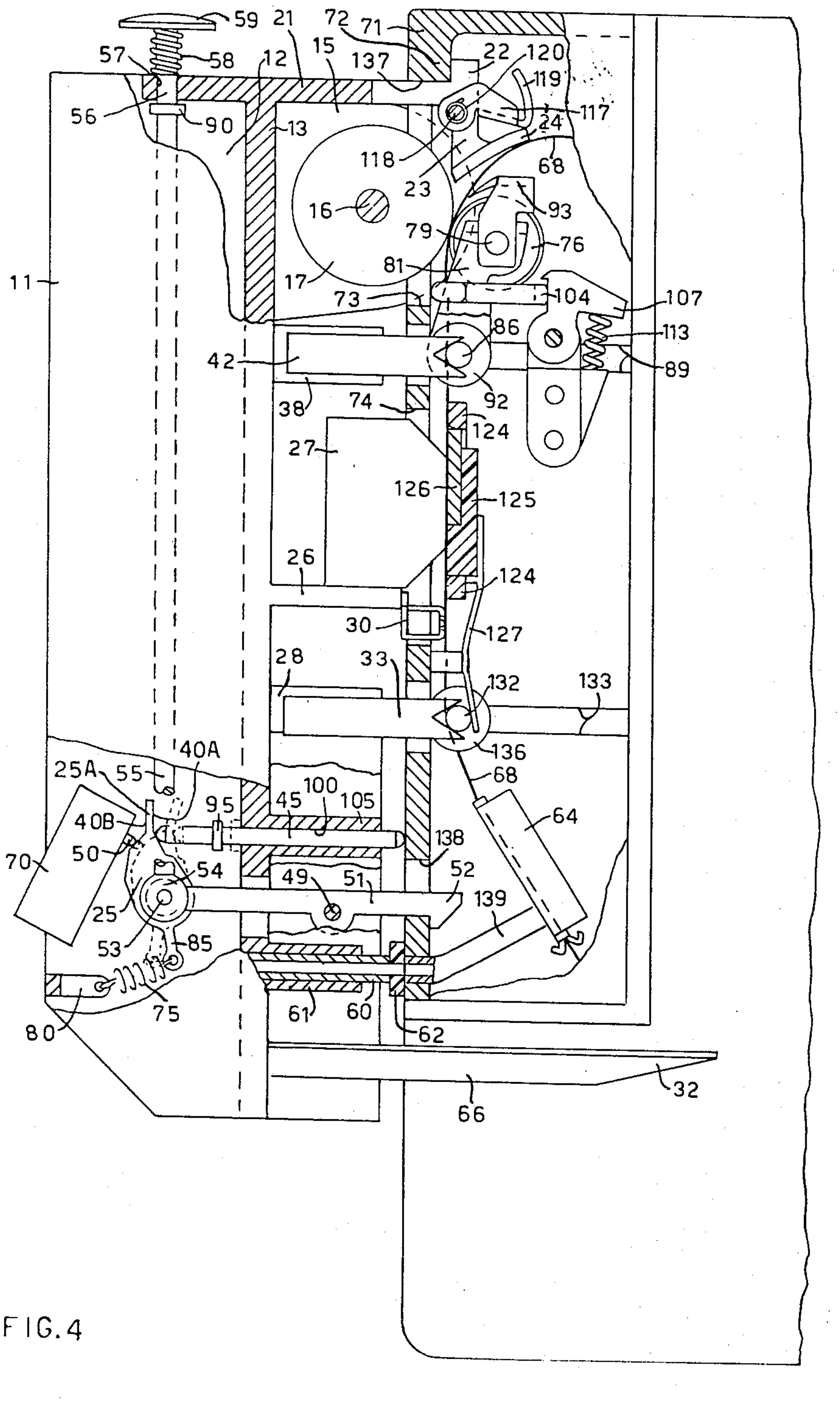
FIG. 4 is a sectional view of the apparatus in the working position.

Also pivoted on the spindle 53 is a cam 25 having its upper profile 25a provided with two slide surfaces 40$a$ and 40$b$ with which a plunger 45 and the push-button 50 of a microswitch 70 are respectively adapted to cooperate. The plunger 45 is seated in the hole 100 in a lateral thickened portion 105 of the side piece 29. A spring 75 is stretched between a lug 80, connected to the uprights 11 and 12, and a lower projection 85 of the cam 25 in order to keep the plunger 45 constantly urged to the right (FIG. 4). This travel is limited by a stop 95.

Behind the plate 13 and not shown in the drawing there is arranged a vacuum pump of known type having a suction tube 60 housed in a lateral thickened portion 61 of the side piece 28. At the other end of the tube 60 there is arranged a cylindrical rubber sealing ring or grommet 62.

Two guides 66 and 67 parallel to one another and having their ends 32 and 41 slightly divergent are arranged at the bottom of the two side pieces 28 and 29 and in a direction perpendicular to the plate 13.

Figure 2:
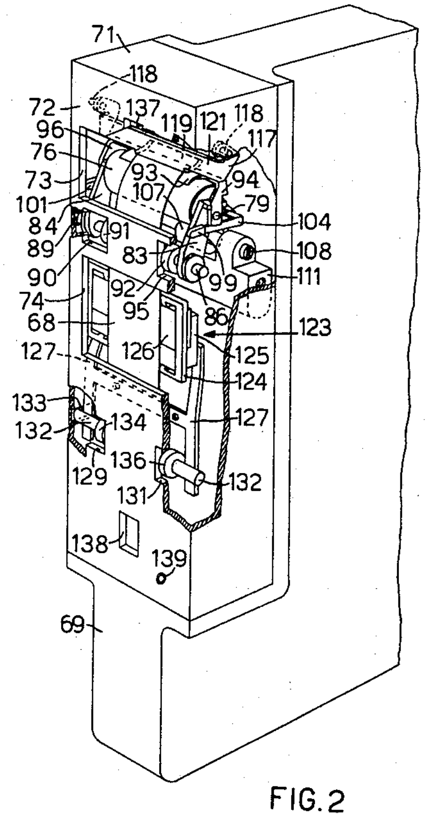
FIG. 2 is a perspective view, partly in section, of the removable portion of the apparatus.

A magnetic tape 68 (FIG. 2) which is closed in the form of a loop, is contained in a tape cartridge 69 of removable type, for example as described in U.S. Patent application, Ser. No. 116,043 filed on 17th Feb. 1971. The tape 68 emerges from the cartridge for a length having its outer face exposed.

On the front face of the cartridge 69 there is arranged a box or housing 71 in the front wall 72 of which are formed two windows 73 and 74 into which the driving roller 17 and the head 27 can respectively penetrate (FIG. 4) to be brought into contact with the tape 68 so as to produce the feed and the recording or playback thereof.

Figure 3:
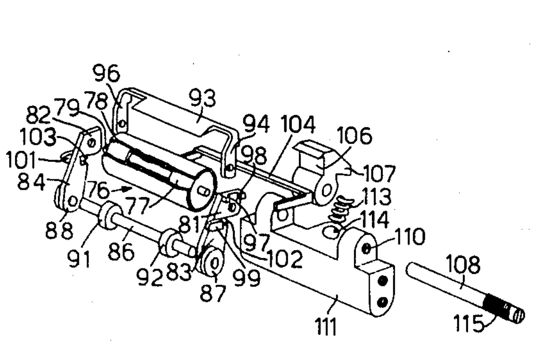
FIG. 3 shows a detail of FIG. 2 in exploded perspective and partly in section.

Constantly in contact with the inner face of the exposed length of the tape 68, in the proximity of the window 73, there is arranged a driven roller 76 (FIGS. 2 and 3) which comprises a metal cylinder 77 having a covering 78 of rubbery material on the outside. The central zone of the metal cylinder 77 is of smaller cross-section than the edge zones, so that the thickness of the covering 78 is greater in the central portion on which the tape 68 normally bears, the tape having a width smaller than that of the two rollers, the driving roller 17 and the driven roller 76, and substantially equal to that of the said central zone. The spindle 79 of the roller 76 is pivoted in the ends 81 and 82 of two arms 83 and 84, respectively, both keyed on a shaft 86 at their respective lower ends 87 and 88.

The ends of the shaft 86 are seated in two grooves 89 only one of which can be seen in the drawing and which are formed in the side walls of the box 71. On the central part of the shaft 86 two centering rollers 91 and 92 are moreover keyed. These have a distance between their inner lateral surfaces which is exactly equal to the width of the tape 68, while the distance between their outer lateral surfaces is substantially equal to the distance between the centring guides 42 and 43. The two rollers 91 and 92 enter corresponding windows 90 and 95 formed in the front wall 72 of the box 71.

Above the roller 76 and slightly spaced therefrom there is arranged a second tape-spacing shoe 93 pivoted by means of its lateral lugs 94 and 96 on the pin 79. So that the shoe 93 may not turn about the pin 79, the lug 94 is housed in a groove 97 formed in a bent portion 98 of the arm 83.

When the arms 83 and 84 are in the rest or inoperative position, that is with the cartridge not mounted, they bear on the inner face of the front wall 72 both with their lower ends 87 and 88 and with their two lateral projections 99 and 101 located on the sides of the arms.

Formed in the two arms 83 and 84 in the proximity of the lateral projections 99 and 101 are two grooves 102 and 103, respectively, each of which is adapted to accommodate one end of a U-shaped fork 104. This fork, in a substantially central position, is adapted to co-operate with the surface 106 (FIG. 3) of a lever 107 which is fulcrumed and can turn on a pin 108 housed in the seat 110 of a block 111 fixed to the box 71. The pin 108 has a threaded portion 115 which allows adjustment of its position in the seat 110 and, therefore, adjustment of the lever 107. The surface 106 of the lever 107 is kept constantly in contact with the fork 104 by the action of a spring 113 housed in a seat 114 in the block 111.

Above the roller 76 there is arranged a safety shield 117 adapted to prevent the tape 68 being able to emerge from the upper opening 73 when the cartridge is withdrawn. This shield, pivoted in the side walls of the box 71 by means of two pins 118, is provided with a tape-pressing shoe 119 which, in the inoperative position and due to the action of two torsion springs 120, urges the tape 68 against the second tape-spacing shoe 93. A front surface 121 of the shield 117 is adapted to co-operate with the front edge of the hook 22 and with the first tape-spacing shoe 24 (FIG. 1) to produce the separation of the safety shield from the tape during the insertion of the cartridge.

Behind the window 74 and in a position suitable for co-operating with the head 27 there is arranged a pressure pad device 123 comprising a frame 124 inside which there is arranged a plate 125 of plastics material provided on its front face with a metal plate 126. Two leaf springs 127 supported by the wall 72 keep the device 123 (which has a width greater than that of the window 74) pressed constantly against the inner face of this wall 72.

In the lower part of the wall 72, in a position of vertical alignment with the windows 90 and 95, there are formed another two windows 129 and 131, respectively, into which enter two centring rollers 134 and 136, respectively, fast with a shaft 132 housed in two grooves 133, one of which can be seen in the drawing and which are formed in the side walls of the box 71. The rollers 134 and 136 have the distance between their inner lateral surfaces exactly equal to the width of the tape 68, while the distance between their outer lateral surfaces is substantially equal to the distance between the centring guides 33 and 34. The shaft 132 is constantly pressed against the inner face of the wall 72 by the lower ends of the leaf springs 127. The shafts 86 and 132, with the relative rollers 91, 92 and 134, 136 are adapted to co-operate with the centering guides 42, 43 and 33, 34 for the centering of the tape 68 with respect to the head 27.

At the upper end of the window 73 there is formed a slot 137 adapted to permit the introduction of the hook 22 and the engagement thereof with the wall 72 (FIG. 4); moreover, a slot 138 formed in the wall 72 below the windows 129 and 131 is adapted to permit the introduction of the hook 52 and the engagement thereof with the wall 72. Therefore, the hooks 22 and 52, co-operating with the slots 137 and 138 are adapted to hold the cartridge 69 on the fixed portion 10.

To the side of the slot 138 there is arranged a tube 139 the outer mouth of which is adapted to mate with the end 62 of the suction tube 60 to connect the vacuum pump to a vacuum brake 64 located inside the box 71 and which acts on the tape 68 before it passes across the recording and/or reading element.

In the inoperative state (FIG. 1), the electromagnetic clutch 18 is not energised and, therefore, the driving roller 17 is stationary. In this state, moreover, owing to the action of the spring 75, the plunger 45 is shifted fully to the right and the cam 25 is disposed rotated clockwise (position indicated by dashes in FIG. 4). The push-button 50 of the microswitch 70, which controls the enabling of the clutch 18, does not co-operate with the slide surface 40 of the cam 25 and, therefore, the microswitch is off.

When the cartridge 69 is not mounted on the fixed portion of the apparatus (FIG. 2), the tape 68 contained in the cartridge is stationary and cannot emerge from the window 73 due to the action of the safety shield 117 which holds the tape 68 against the tape-spacing shoe 93 by means of its tape-pressing shoe 119.

In order to record or play back the tape 68, the cartridge 69 is presented to the fixed portion 10 of the apparatus. The guides 66 and 67 facilitate this operation of approach, ensuring a first approximate centering of the removable cartridge 69 with respect to the fixed portion 10.

The attachment of the cartridge 69 to the fixed portion 10 (FIG. 4) is obtained by means of the hooks 22 and 52, which co-operate with the slots 137 and 138. The cartridge is first hooked on to the fixed hook 22, which is housed in the slot 137, and is then urged against the fixed portion 10, causing the raising of the hook 52 until it snaps into the position of FIG. 4. The location of the cartridge 69 in the vertical direction with respect to the fixed portion 10 is therefore obtained by means of these same attaching elements.

The positioning of the cartridge and, therefore, of the tape 68 in the horizontal direction with respect to the head 27 is obtained by means of the two pairs of guides 33, 34 and 42, 43 as a result of the engagement of the shafts 132, 86 with the first and second pairs of guides respectively and, therefore, of the co-operation of the first pair of guides with the rollers 134 and 136 and of the second pair of guides with the rollers 91 and 92. Thus, the shaft 132 nests in the grooves 36 and 37, while the shaft 86 nests in the grooves 44 and 46. Moreover, owing to the action of the leaf springs 47 and 48, which press against the outer lateral surfaces of the rollers 134 and 91, the rollers 136 and 92 are brought into contact at their outer lateral surfaces with the inner lateral surfaces of the guides 33 and 42, which act as abutments to produce in this way the centring of the tape-guiding rollers in the horizontal direction.

The lower ends of the leaf springs 127 now hold the shaft 132 pressed constantly against the guides 33 and 34, while the spring 113, by means of the fork 104 and the arms 83 and 84, keeps the shaft 86 pressed constantly against the guides 42 and 43. The upper ends of the leaf springs 127 press against the pressure pad device 123 so that the latter holds the tape 68 constantly in contact with the head 27.

In the operation of approach of the cartridge 69 to the fixed portion 10 of the apparatus the tape-cleaning bar 30 enters the window 74 until it is brought into contact with the tape 68.

The coupling of the cartridge 69 to the fixed portion 10 brings the driving roller 17 into contact both with the tape 68 and with the driven roller 76. More particularly, the tape 68 lies on the central part of the roller 76, where the covering 78 has a greater thickness, while, owing to the slight thickness of the tape, which beds into the covering 78, the lateral edges of the roller 76 can directly contact the driving roller 17. Since the coefficient of friction between the cylindrical surfaces of the two entraining rollers is greater than the coefficients of friction between the surfaces of the driving roller and the tape, the entrainment of the driven roller is effected substantially by the frictional forces exerted between the edges of the two directly coupled rollers. Consequently, even during the phase of starting up of the tape, it will not be subjected to rubbing by the surfaces of the two rollers.

The contact pressure between the two rollers is supplied by the spring 113 through the fork 104 and the arms 83 and 84. If this force should not be exactly centered, with the consequent disadvantage of imperfect entrainment of the tape due to the non-uniform pressure between the driven roller 76 and the driving roller 17, this can easily be remedied by adjusting the position of the lever 107 by screwing the pin 108 in or out.

After the tape 68 has been passed between the rollers 17 and 76, it is guided by the tape-spacing shoes 93 and 24; the latter, moreover, on the coupling of the cartridge 69 to the fixed portion 10, moves the shield 117 away from the tape 68 by pressing against the front part 121 of the shield.

In this position, moreover, the plunger 45, urged by the wall 72 of the box 71, is shifted fully to the left (FIG. 4) and the cam 25 is disposed rotated anticlockwise, as a result of which the push-button 50 of the microswitch 70 is pressed in and therefore the clutch 18 can be energized so that the driving roller 17 may be set in rotation.

The microswitch 70, in controlling the clutch 18, acts as a double safety device; in fact, in order that the push-button 50 may be actuated, it is not sufficient for the plunger 45 to be urged to the left by the cartridge 69, but it is also necessary for the hook 52 of the catch 51 to have perfectly engaged the wall 72 in correspondence the the slot 138. If this latter condition should not be realized, the cam 25 would remain shifted downwardly and the push-button 50 would co-operate only with the upper part of the slide surface 40*b* and remain deactivated.

Moreover, when the cartridge 69 is coupled to the fixed portion 10, the two tubes 60 and 139 are brought one into correspondence with the other and the seal is ensured by the rubber ring or grommet 62, which is slightly compressed by the wall 72 of the box 71. Therefore, once the removable portion has been coupled to the fixed portion of the arrangement, the clutch 18 can be energized and the driving roller 17 can be set in motion.

As has already been stated, in the starting-up phase, the tape 68 is not subjected to any rubbing either against the roller 17 or against the roller 76. In fact, since the spring 113, acting through the lever 107 and the fork 104, transmits an equally distributed force to the arms 83 and 84 and since the covering 78 of the roller 76 is thinner at the edges, the frictional force between the driving roller 17 and the driven roller 76, which produces the carrying along of the latter, is manifested to a greater degree precisely at the edges; the tape 68 lies on the thicker central part of the covering 78 and the frictional force which is created at said central part is sufficient to carry the tape 68 along.

Moreover, the edges of the driven roller 76 being relatively rigid with respect to the central part, owing to the smaller thickness of the covering, any possible unbalance of the force exerted by the fork 104 under the action of the spring 113 is unloaded essentially on to the edges of the roller 76, leaving the pressure on the tape constant.

The vacuum brake 64 brakes the tape 68 slightly so that it is constantly tensioned in the exposed portion or length and in particular in the portion in the proximity of the head 27, so that it may be correctly recorded or played back.

Before the tape 68 comes into contact with the head 27, it passes over the tape-cleaning bar 30 which retains by means of its holes 35 any dust which has possibly been deposited on the exposed face of the tape.

When the cartridge has been recorded or played back, it can be withdrawn from the fixed portion 10 of the apparatus. This is achieved by pressing the knob 59 downwardly, as a result of which the catch 51 is caused to turn anticlockwise and the hook 52 is disengaged from the slot 138. The push-button 50 is thus released and this prevents the clutch 18 remaining energized.

It is therefore clear that the tape cartridge is equipped with a driven roller constantly in contact with the inner face of the exposed length of tape and that this roller is adapted to co-operate by adapting itself to the driving roller for the feed of the tape.

It is moreover clear that in this feed arrangement, owing to the effect of the uniform distribution of the pressure over the entraining rollers, the tape can advance at constant speed and the tape is prevented from being subjected to rubbing by the driving roller in the starting stage.

Finally, in the described embodiment, since the coated surface of the tape comes into contact (in addition to the head) only with the driving roller, which is made of metal of high hardness, the possibility of magnetic powder deposited by the tape damaging the arrangement by infiltrating on to the surfaces of the entraining rollers is obviated.

What I claim is:

1. Apparatus for the feed of magnetic recording tape comprising a fixed part including a magnetic head and a tape driving roller, a removable cartridge containing the tape and having a driven roller for contacting the rear surface of said tape, means for attaching said cartridge to said fixed part in a fixed position in which an exposed portion of said tape bears against said magnetic head and an exposed portion of said tape is nipped between said driving roller and said driven roller, a pair of spaced levers rotatably supporting said driven roller, said pair of levers being pivotally mounted on a common shaft, mounting means on said cartridge supporting said common shaft, a U-shaped fork member mounted on said cartridge having a base portion and a pair of arms coupled respectively to each of said pair of levers, an intermediate member mounted in said cartridge engaging said fork member, and spring means acting on said intermediate member to urge said pair of arms in such a direction as to push said driven roller against said driving roller when said cartridge is mounted on said fixed part with forces distributed in a substantially uniform manner.

2. Apparatus according to claim 1, wherein the driven roller comprises a central cylindrical body and a cylindrical body covering of resilient rubbery material, said cylindrical body having a pair of edge portions flanking a central portion of smaller cross-section than said edge portions, the thickness of said covering being correspondingly several times greater in said central portion than in said edge zones, the width of said central portion being substantially equal to the width of said tape so that, when said driving roller and said driven roller are pressed together, said tape lies in the more resilient said central portion while said driving roller and said driven roller directly contact one another at the less resilient said edge portions, whereby the entrainment of said driven roller is effected substantially by the frictional forces exerted in said edge zones.

3. Apparatus according to claim 1, further comprising centering guides on said fixed part for centering said tape with respect to said magnetic head, wherein said mounting means on said cartridge comprises means defining two grooves substantially perpendicular to said tape which slidably support said common shaft, said centering guides being provided with V-shaped surfaces parallel to the axis of said driving roller engagable with said common shaft to support said common shaft as said cartridge is being fitted on said fixed part.

4. Apparatus for the feed of magnetic recording tape contained in a removable cartridge, comprising a tape driving roller, a driven roller having a rigid cylindrical body covered with resilient rubbery material, wherein said cylindrical body has a central portion flanked by a pair of edge portions, the cross-section of said central portion being less than the cross-section of said edge portions while the thickness of said rubbery material is correspondingly several times greater in said central portion than in said edge portions, the width of said central portion being substantially equal to the width of said tape, so that, during the feed of said tape, said tape lies on the more resilient said central portion of said covering, allowing said driving roller and said driven roller to be in direct contact along the said edge portions whereby the entrainment of said driven roller is effected substantially by the frictional forces which are exerted on said edge portions.

5. Apparatus according to claim 4, wherein the starting and stopping of the driving roller for the feed of the tape is controlled by a clutch of electromagnetic type connected directly to the driving roller.

6. Apparatus for feed of magnetic recording tape contained in a removable cartridge comprising a tape driving roller, a driven roller, two fixing hooks adapted to engage with corresponding slots in said cartridge, a microswitch for controlling a driving roller motor, a sensing plunger cooperating with said cartridge when fitted for controlling said microswitch, and an actuating cam pivoted on one of said two hooks and having a first surface adapted to cooperate with said plunger and a second surface adapted to cooperate with the push-button of said microswitch.

* * * * *